July 21, 1953 J. F. ROSS 2,645,794
THREADING MACHINE FIXTURE
Filed March 15, 1950 2 Sheets-Sheet 1

INVENTOR.
Joseph F. Ross,
BY
Davis, Lindsey, Hibben & Noyes
Attys.

July 21, 1953　　　　J. F. ROSS　　　　2,645,794
THREADING MACHINE FIXTURE
Filed March 15, 1950　　　　　　　　　　　2 Sheets-Sheet 2
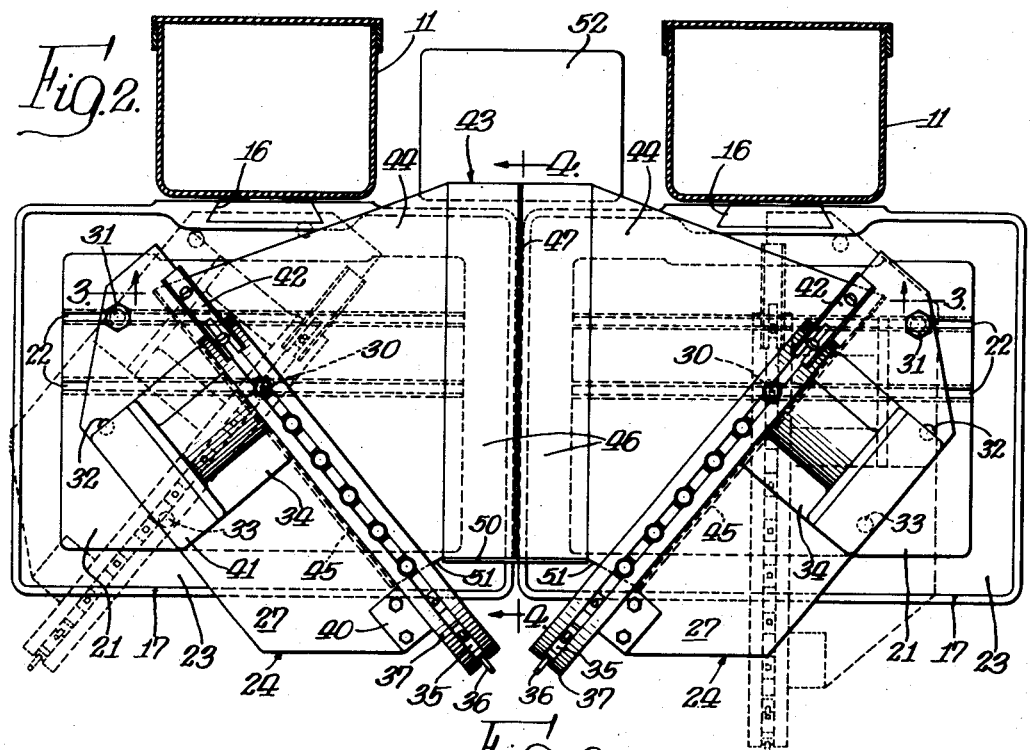
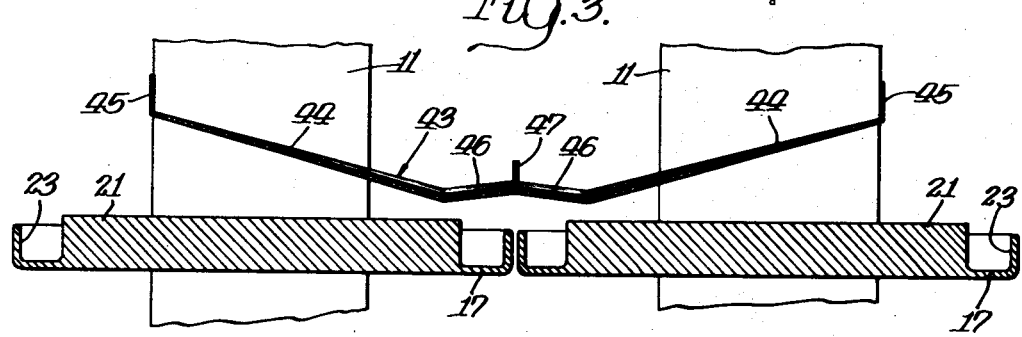
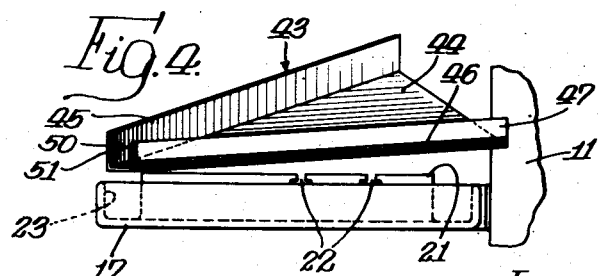
INVENTOR.
Joseph F. Ross,
BY
Davis, Lindsey, Hibben + Noyes
Attys.

Patented July 21, 1953

2,645,794

UNITED STATES PATENT OFFICE 2,645,794

THREADING MACHINE FIXTURE

Joseph F. Ross, Glencoe, Ill., assignor to J. J. Tourek Mfg. Co., Chicago, Ill., a corporation of Illinois Application March 15, 1950, Serial No. 149,728

3 Claims. (Cl. 10—107)

The invention relates generally to threading machines and more particularly to a machine for cutting threads on small articles.

For cutting threads on small articles, machines are available on the market today, which comprise a table adapted to support a work holder, and a vertical spindle carrying a thread cutting tool in the form of a tap or a die. The spindle is adapted to be rotatably driven and at the same time fed downwardly toward the work to cut the thread, and if the die head is not of the self-opening type, the spindle must then be reversed in rotation and feed to move the tool away from the work. If a die head of the self-opening type is used, then no reversal of rotation is necessary and the spindle may be moved upward with a quick return. For production work where a large number of similar pieces are to be threaded, the drive and feed of the spindle are automatically controlled.

In conjunction with machines of this type, automatically operated work holders have been developed, in which the work pieces are loaded by hand but the work holder moves the work pieces automatically into cutting position and then discharges the finished pieces in timed relation with the movement of the spindle. One common form of such a work holder comprises a circular dial intermittently rotatable on a horizontal axis and having a series of work holding devices on its periphery. The work pieces are loaded onto the work holding devices as they approach the position under the spindle and the movement of the dial carries them one-by-one into cutting position.

Work holders of this form have a number of disadvantages. Thus, with the work pieces held on the individual work holding devices only by gravity, as is usually the case, only those positions near the top of the dial may be loaded because below that the work pieces would fall off. Furthermore, the operator's hand has to be placed quite near the spindle in placing the work pieces on the dial and is in some danger of becoming entangled in the mechanism. Moreover, if the cutting operation requires but a small amount of time, the operator may, through inattention, fail to load every position on the dial, since there usually is only one or at best two positions on the dial ahead of the cutting position which are so located that the work pieces will be held thereon. Production time for the machine is, therefore, lost since it will move through its cycle idly with no work piece at the cutting position. The operator's difficulty in loading a fixture of this character is also increased because of the distance he has to reach from a pan or other container for the unthreaded pieces to the loading positions on the dial. Oil is frequently piped to the cutting position to facilitate the cutting action, and because of the proximity of the loading position to the cutting position, the operator's hand may come within the range of the oil spray, making the work pieces difficult to handle.

The cutting time for some work pieces may be such that a single operator could easily feed work pieces to two machines if the loading positions for both machines were relatively close together and close to the pan or container holding the unthreaded pieces. But with the dial type fixtures mentioned above, not only is the distance from the pan to the loading position too great for convenience but it would be impossible from a production standpoint for one operator to attempt to keep the fixtures on two such machines loaded.

The general object of the invention is to provide a novel work fixture for a machine of the foregoing type, which eliminates the difficulties heretofore described and enables an operator to maintain a high rate of production with safety.

More specifically, it is an object to provide a novel work fixture for a machine of the foregoing type, which permits an operator to easily and conveniently load every work holding device on the fixture before it reaches the cutting position so that a maximum production rate is thereby maintained.

Another object is to provide a novel work fixture for a machine of the foregoing character, which enables one operator to feed work to two machines at the same time.

A further object is to provide a novel work fixture for a machine of the foregoing type, which may be shifted on the table of the machine into positions such that it may be loaded with work pieces at the same time that a machine on its right side is fed, or at the same time that a machine on its left is fed, as well as into a central position, when the machine is to be operated alone and not in conjunction with another machine.

Still another object is to provide a novel work fixture for a machine of the foregoing type, from which the work is automatically unloaded and the chips are separated from the finished work pieces and are held in a convenient position for disposal while the oil carried by the chips is drained off and returned to the oil supply system of the machine.

Other objects and advantages will become apparent from the following description taken in connection with the accompanying drawings, in which:

Fig. 2 is a plan view of the two machines with their fixtures, partially in section, taken along the line 2—2 of Fig. 1.

Fig. 3 is a fragmentary sectional view taken on the line 3—3 of Fig. 2.

Fig. 4 is a fragmentary sectional view taken on the line 4—4 of Fig. 2.

Figure 1:
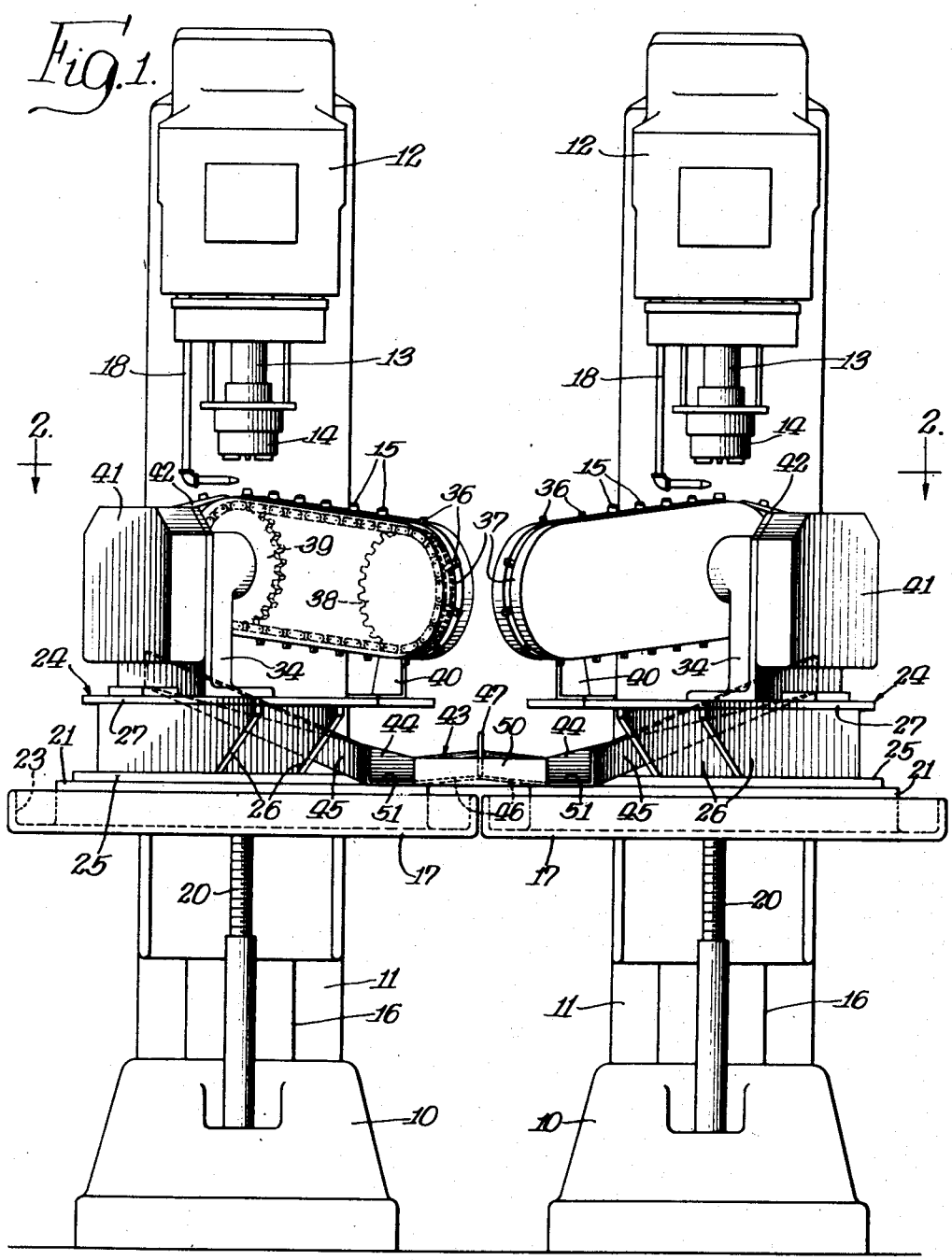
Figure 1 is an elevational view of two threading machines positioned side by side and showing each provided with a fixture embodying the features of the invention.

A threading machine of the character for which the present fixture is adapted is illustrated in Figs. 1 and 2 and is shown in the present instance as comprising a base 10 supporting a vertically extending column 11. Mounted on the upper portion of the column is a spindle supporting head 12, carrying a spindle 13 with its axis vertical. The spindle 13 is rotatably driven and is mounted for vertical reciprocating movement. Such movement is usually automatically controlled. The lower end of the spindle 13 is arranged to carry a threading tool which is here illlustrated as a die 14 for threading the exterior of work pieces, indicated at 15. Piping, indicated at 18, may also be provided for spray oil or other cutting fluid on the work pieces during the cutting operations. The column 11 is also provided with ways 16 on which is mounted a table 17. The table 17 is adapted to be adjusted vertically on the ways 16, a screw 20 being provided for this purpose. The table 17 is provided with a main bed 21 having the usual T-slots 22 formed therein. Such T-slots are, of course, provided for holding a fixture or the like thereon. The table 17 also includes a gutter 23 extending about the edge of the bed to collect oil or other cutting fluid that may be sprayed on the work as the cutting takes place.

As is apparent from the foregoing, a fixture embodying the features of the invention is adapted to be mounted on the bed portion 21 of the table 17 with the fixture so positioned as to bring the work pieces into alignment with the axis of the spindle 13. Since the spindle 13 overhangs the work table with the fixture thereon and is located toward the rear of the table, an operator sitting at the front of the machine would have to move each work piece a substantial distance from a work holding pan positioned beside him to a position adjacent the spindle axis if the work fixture were such that it could only be loaded in positions adjacent the spindle axis. This situation would, of course, prevent a high rate of production being attained and would necessitate the operator moving his hands close to the spindle.

The present fixture is of such construction that it projects forwardly from the spindle axis and may be loaded with work pieces at positions located adjacent the front edge of the table. Thus, very little movement of the operator is required to take a work piece from a pan adjacent the front of the machine and place it on the work fixture. With this construction of the fixture, the operator's hands do not have to approach the spindle, so that it is safer from that standpoint and it also permits the operator to keep his hand out of the oil spray that is frequently provided for cutting operations. Furthermore, by having the fixture extend forwardly from the spindle axis, a substantial number of work holding positions may be provided thereon which are available for loading before they reach the cutting position in line with the axis of the spindle. An operator is thus readily able to load every work holding position on the fixture as it moves toward the cutting position so that no production is lost due to vacant work holders moving under the spindle.

With small work pieces and the convenience provided by a fixture of this character, an operator has time to load the fixtures on two machines simultaneously, thus materially increasing the production rate. The fixture is, therefore, constructed so that it may be shifted on the table 17 into three different positions, one turned toward one side of the machine so that the fixture may be loaded at the same time as a similar fixture on another machine at the same side, another toward the other side of the machine for use in connection with a fixture on a machine at that side, and a third position in which it projects straight forwardly of the machine so that, if only one machine is to be used for threading a particular work piece, the work fixture can be most conveniently positioned for such work. In Fig. 2 of the drawings, I have shown the two machines side by side and the fixtures, shown in full lines, are in the preferred position for one operator to load both of the work fixtures on such machines. On the left-hand machine shown in Fig. 2, a dotted-line position for the work fixture is shown when it is to be used with a machine to the left of the illustrated machine. In the right-hand machine of this figure, a dotted line position for the work fixture is shown when it is to be used alone and not in conjunction with a fixture on an adjacent machine. In moving the fixture from one position to the other, it is, of course, swung about the spindle axis as a center.

In the preferred embodiment, the fixture comprises a base indicated generally at 24 and comprising a bottom plate 25, spaced vertically extending plates 26 and a top plate 27, the plates being welded together. The bottom plate 25 is provided with bolt holes, through which bolts mounted in the T-slots 22 of the bed may extend to rigidly secure the fixture to the table. In the present instance, the bottom plate is provided with one hole, indicated at 30, which is located directly in line with the spindle axis and is adapted to receive a bolt mounted in the front T-slot of the two slots illustrated. The bottom plate is also adapted to be secured by a second bolt 31 adapted to be received in the rear T-slot. However, since the fixture is adapted to be swung about the spindle axis to move it from one position to another, three holes are provided for the bolt 31. In Fig. 2, the bolt 31 is shown as mounted in the rearmost hole for the full-line position of the fixture shown in that figure. A hole 32 is also provided to receive the bolt 31 when the fixture is shifted to the straight forward position illustrated in dotted lines in the right-hand machine of Fig. 2. A third hole 33 is provided to receive the bolt 31 when the fixture is shifted to the left-hand position shown in dotted lines on the left-hand machine of Fig. 2. The bolt extending through the hole 30, of course, remains in such hole for all positions of the fixture since this bolt is located on the spindle axis and the shifting of the fixture for its different positions is about such axis.

Mounted on the top plate 27 is a bracket or support 34 carrying one end of the carrier means for moving the work pieces into cutting position under the spindle. In the preferred arrangement, such means comprises an endless chain 35, the links of which are provided with work holding devices 36. The chain 35 is mounted within a casing 37 secured at its rear end to the support 34 and extending forwardly therefrom. At its front end, the casing 37 is preferably carried by a second bracket 40 mounted on the top plate 27. The casing 37 is provided with a slot through which the work holding devices 36 extend. Thus, the casing with the chain extends generally forwardly from the spindle axis and is substantially horizontal, although preferably it is slightly lower at its front end than at its rear end, as illustrated in Fig. 1, to facilitate loading of the work holding devices 36. The chain 35 is carried on sprockets, one indicated at 38 being an idler sprocket and being supported in the front end of the casing 37 and the other indicated at 39 being a drive sprocket mounted in the rear end of the casing. The sprockets are mounted on horizontal axes with the axis of the rear sprocket 38 intersecting the spindle axis so that the latter extends radially of the rear sprocket.

The chain is adapted to be intermittently driven by mechanism enclosed within a housing 41 carried on the rear support 34 and provided with a shaft (not shown) extending through the support 34 to the rear sprocket 39. Such drive mechanism is, of course, operated in timed relation with the reciprocation of the spindle 13 so that each time the spindle is moved downwardly into cutting position and then moved upwardly away from the work, the chain is advanced the distance of one work holding device to bring the next work piece into position under the spindle. The direction of rotation is, of course, such that the upper run of the chain moves from the front sprocket 38 rearwardly toward the rear sprocket 39. With this arrangement, the work holding devices 36 on the upper run of the chain may be loaded with work pieces.

Because of the spacing of the two sprockets carrying the chain 35 and the direction of movement thereof, all of the work holding devices 36 on the upper run of the chain are available for an operator to load work pieces thereon. In the particular structure illustrated in the drawings, it will be noted from Fig. 1 that there are six work holding devices located on the upper run of the chain between the front end of the fixture and the cutting position under the spindle. Thus, the operator may readily load all of the work holding devices before they reach the cutting position since all of these positions are readily accessible to the operator without necessitating his placing his hand too close to the spindle. In fact, by having as many work holding devices available for loading as is here provided, there seems to be a psychological effect upon an operator to see that every one of them is loaded and not to miss any of them. In the present instance, the work pieces 15 are shown as small, externally threaded plugs having square sockets in one end. The work holding devices, therefore, are merely square rods adapted to be inserted in the sockets and the work pieces thus are held against turning but remain thereon by gravity. Since the outer or front ends of the two work holding fixtures on adjoining machines are close to each other, it is obvious that one operator can load both of them easily from one pan containing the unthreaded pieces, the operator sitting or standing adjacent the point where the front ends of the two fixtures approach each other. Moreover, not only does the operator avoid any chance of being injured by his hand encountering the spindle but he also avoids getting his hand in the oil which may be sprayed on the work piece being threaded.

In order that the operator may give his entire attention to the loading of the work pieces on the chain 35, means is provided in each machine as a part of the fixture for removing the work pieces from the work holding devices 36 automatically after they have been threaded. With the particular form of work piece herein shown, all that is needed is a work removing element in the form of a fixed fork 42 mounted on the fixture rearwardly of the axis of the spindle where the carrier chain 35 moves downwardly over the rear sprocket 39. As will be evident in Fig. 2, the fork 42 is slotted to provide two tines positioned on opposite sides of the chain, the slot between the tines permitting the work holders 36 to move therein. As the sprocket moves the chain downwardly the fork engages under the work piece and gradually pulls it off the work holding fixture or rod 36. The finished work piece is then free to fall into a suitable bin or pan provided for that purpose.

The invention also contemplates means constituting a part of the fixture for collecting the chips from the threading operation and for draining the oil therefrom. Such chip collecting and oil draining means is arranged so that the chips from both machines may be removed at a common point, but the oil from each of the machines is returned to its own reservoir so that the reservoirs for both machines will thus be kept replenished. To this end, a chip collecting pan, indicated generally at 43, is provided. The chip collecting pan may be made suitable for just one machine but it is herein shown as double formation to accommodate two machines. In this form, the chip collecting pan is mounted between the two fixtures and is provided with a central portion where the chips collect and the oil is drained. The pan 43 in its preferred form comprises bottom portions 44 which slant downwardly toward each other and toward the front of the machine. The outer edge of each bottom portion 44 is positioned under the fixture and is in line with the casing 37 housing the carrier chain. At its outer edge each bottom portion 44 is provided with a small upwardly extending flange 45. The chips from each machine thus fall onto the bottom portion 44 and slide toward the center of the pan. At the center, the bottom portion is bent upwardly as indicated at 46 (see Fig. 3) so that two parallel troughs are thereby formed overlying adjoining edges of the tables of the two machines. A central partition 47 may be provided between the two troughs for stiffening purposes. The troughs have a slight slant forwardly due to the position of the bottom portions 44 whereby oil carried by and with the chips will flow forwardly in the troughs.

At the front ends of the trough there is a barrier 50 which extends across the portions 46 so that front openings 51 between the barrier 50 and the front edges of the flanges 45 are provided through which the oil may drain. These openings 51 overlie the gutters 23 provided in the tables 17, as is evident in Fig. 4, so that the oil thus drains into the gutters of the respective machines from where it may be conducted back to supply means of both machines for repumping it to the cutting positions. The chips remain in the troughs, which are side by side and thus may be raked rearwardly of the machines into a single pan 52 after the oil has drained therefrom. It is obvious, of course, that the pan 43, instead of being made in a double formation as illustrated, may be made in two separate parts meeting each other along the line of the central partition 47.

With a fixture of the present character, it is obvious that one operator may load work pieces into the fixtures of two machines at the same time, since the two fixtures may be turned toward each other with their front ends closely adjacent so that the operator can easily place work pieces on the work holders of both fixtures conveniently from a nearby pan containing the unfinished work pieces. With the length of the upper run of the chain of each fixture and with the relatively large number of work holding devices on such upper run available at all times, the operator is easily able to keep all of the devices loaded even though the operator's attention may be momentarily diverted from the actual loading operation. If he fails to place a work piece on one of the work holding devices when it first turns up into substantially vertical position, such work holding device is still accessible for placing a work piece thereon, even though it has started moving rearwardly toward the cutting position. With this arrangement, too, the operator's hands are kept away from the spindle, avoiding danger of becoming entangled therewith, as well as keeping his hands out of the oil stream pumped to the cutting position. With the automatic work removing device comprising the fork 42, the operator gives no attention to the removal of the work piece, so that his entire time may be utilized in seeing that the work holding devices on the upper run of the chains are loaded.

By mounting the fixtures adjustably on the tables of the machines, they may be turned in either direction to cooperate with fixtures on machines at either side thereof, or they may be moved to a straight forward position if the job to be performed is such that it does not warrant setting up two machines for the purpose. For different types of work pieces, the work holding devices may, of course, be altered to suit the particular work piece. Thus, while I have shown work holding devices suitable for mounting work pieces thereon which are provided with a square socket, it will, of course, be obvious that other types of devices might be provided to hold the work pieces in other ways, such as engaging them externally where the work pieces are to be internally threaded by a tapping tool instead of the die 14.

I claim:

1. The combination of a threading machine or the like having a rotatably driven reciprocable tool carrying spindle, and a work holding fixture comprising a rotatably driven member positioned with the axis of the tool spindle extending radially of the driven member, a rotatable idler member positioned with its axis parallel to the axis of the driven member and remote from the axis of the spindle, an endless carrier extending over said idler and driven members and driven by the latter, said carrier having a plurality of work holding devices mounted thereon, and means for supporting said members, said means being pivotally mounted on said machine for swinging movement about the axis of said spindle and having a device for clamping said means in a plurality of positions about said axis, whereby said carrier may extend in any direction convenient for the operator to load work pieces on said work holding devices.

2. The combination of a threading machine or the like having a vertical rotatably driven reciprocable tool carrying spindle and a table below said spindle, and a work holding fixture comprising a rotatably driven member positioned with its axis horizontal under said spindle with the axis of the latter extending radially of the member, an idler member positioned with its axis parallel to the axis of the driven member and remote from the axis of the spindle, an endless carrier connecting said members and having its upper run movable toward said driven member by the latter, said carrier having a plurality of spaced work holding devices mounted thereon, and a support for said members shiftably mounted on said table and having a pivotal element connecting said support and said table and aligned with said spindle, and a clamping element eccentric to said axis and selectively engageable with different points on said support, whereby said carrier may be adjusted to extend forwardly or to one side or the other of the machine to suit the convenience of the operator in loading work pieces on the work holding devices on the upper run of the carrier.

3. The combination of a threading machine or the like having a vertical rotatably driven reciprocable tool carrying spindle and a table below said spindle, said table having a pair of laterally spaced T slots therein, and a work-holding fixture comprising a base mounted on said table, driving mechanism mounted on said base, a drive sprocket carried by said mechanism, said mechanism carrying said sprocket with its axis horizontal and with the spindle axis extending radially of the sprocket, an idler sprocket, a support mounted on said base and positioning said idler sprocket horizontally from and in alignment with said drive sprocket, an endless chain connecting said sprockets and driven by said drive sprocket, and a plurality of work holding devices carried by said chain, said base having a pivot bolt mounted in one of said T slots in alignment with the spindle axis to permit angular adjustment of said base on said table, and having a clamping bolt extending from the other of said T slots into any one of a plurality of holes in said base whereby said idler sprocket may be positioned adjacent the idler sprocket of a similar fixture on an adjacent machine at either side so that an operator can conveniently load work pieces on the work holding devices of both chains.

JOSEPH F. ROSS.

References Cited in the file of this patent

UNITED STATES PATENTS

| Number | Name | Date |
|---|---|---|
| 410,784 | Colville | Sept. 10, 1889 |
| 1,105,749 | Breitenstein | Aug. 4, 1914 |
| 1,970,018 | Poole | Aug. 14, 1934 |
| 2,083,023 | Johnson et al. | June 8, 1937 |
| 2,464,728 | Stover | Mar. 15, 1949 |

FOREIGN PATENTS

| Number | Country | Date |
|---|---|---|
| 304,909 | Great Britain | Jan. 31, 1929 |